T. I. DUFFY.
TIRE CARRIER AND LAMP SUPPORTING BRACKET.
APPLICATION FILED JUNE 19, 1912.
1,104,173.
Patented July 21, 1914.
3 SHEETS—SHEET 2.
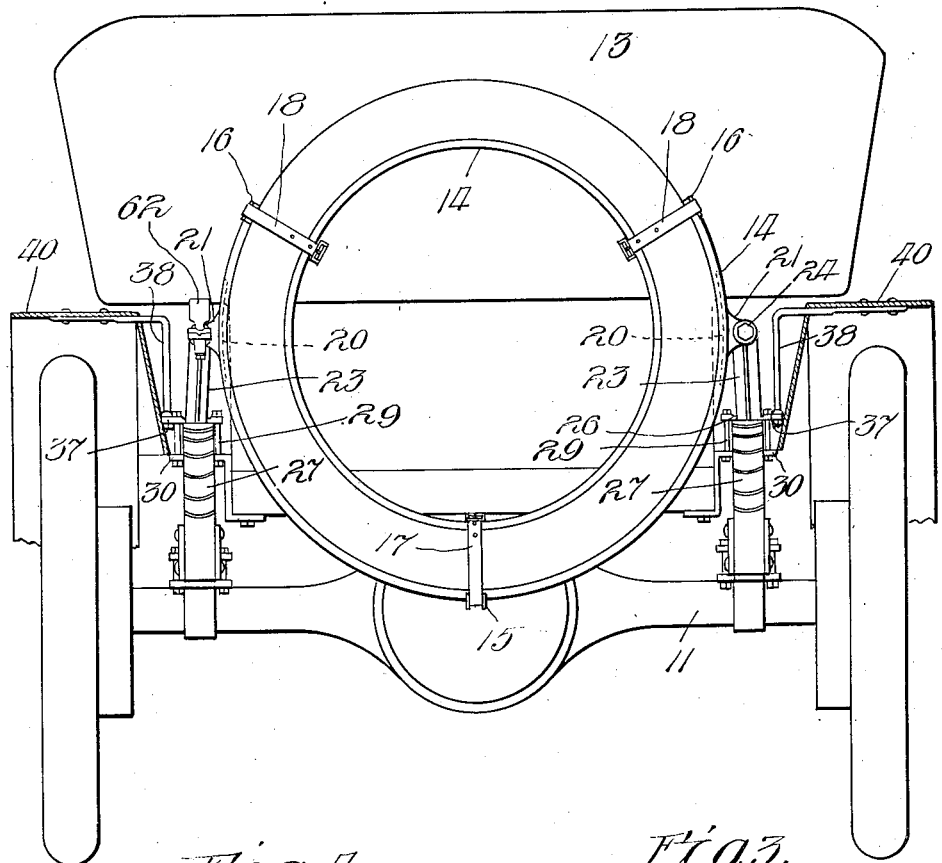
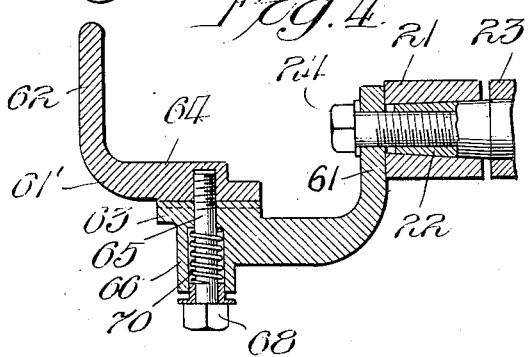
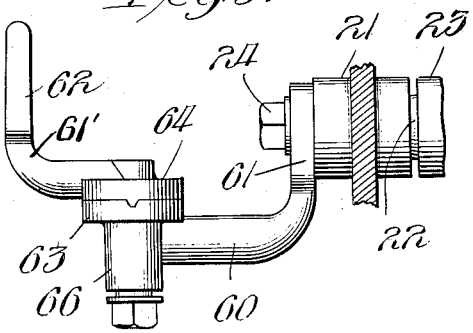
Witnesses:
Harry S. Gaither
G. E. Dowle
Inventor:
Thomas I. Duffy
by William W. Hall
Atty

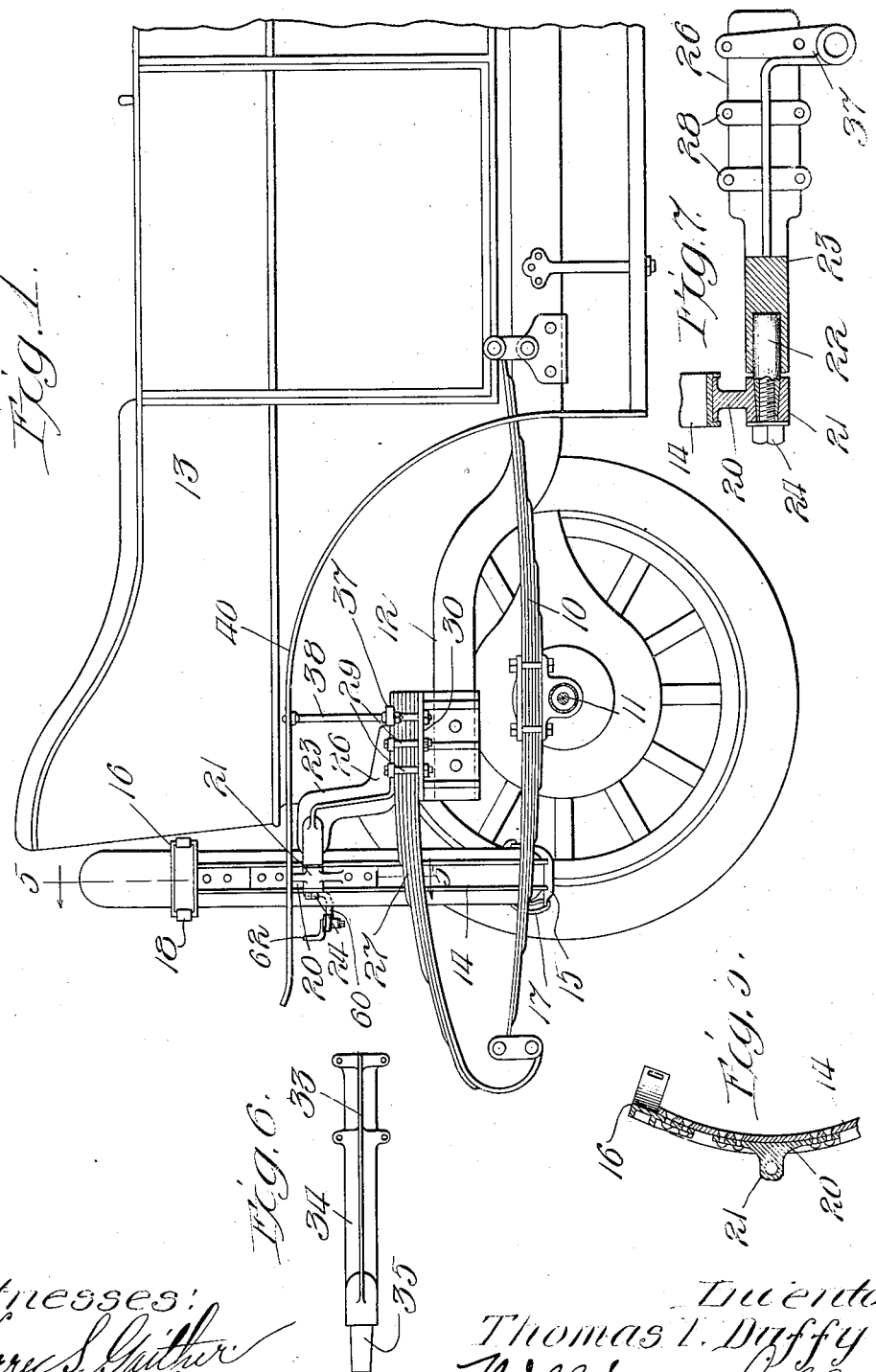

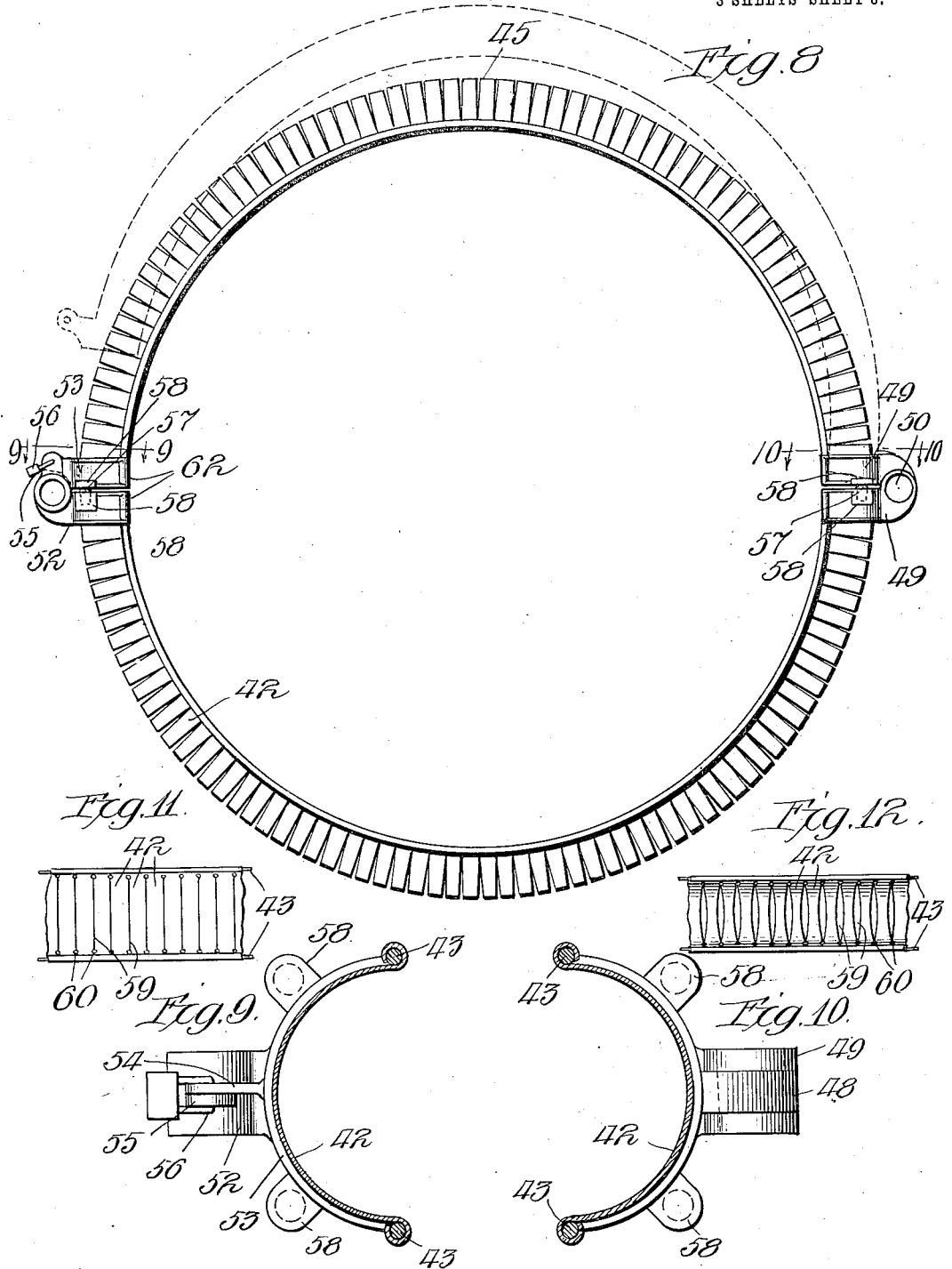

UNITED STATES PATENT OFFICE.

THOMAS I. DUFFY, OF CHICAGO, ILLINOIS, ASSIGNOR TO E. C. SALES CO., OF CHICAGO, ILLINOIS, A CORPORATION OF ILLINOIS.

TIRE-CARRIER AND LAMP-SUPPORTING BRACKET.

1,104,173.  Specification of Letters Patent.  Patented July 21, 1914.

Application filed June 19, 1912. Serial No. 704,629.

*To all whom it may concern:*

Be it known that I, THOMAS I. DUFFY, a citizen of the United States, and a resident of Chicago, in the county of Cook and State of Illinois, have invented certain new and useful Improvements in Tire-Carriers and Lamp-Supporting Brackets; and I do hereby declare that the following is a full, clear, and exact description thereof, reference being had to the accompanying drawings, and to the characters of reference marked thereon, which form a part of this specification.

This invention relates to improvements in tire carriers for motor vehicles, to an improved mounting for supporting the carriers on the vehicle, and to an improved lamp or lamp and license sign support by which to carry a tail lamp or lamp and license sign on the vehicle.

The invention consists in the matters hereinafter set forth and more particularly pointed out in the appended claims.

In the drawings,—Figure 1 is a partial side elevation with the rear axle shown in section of a motor vehicle provided with a tire carrier and lamp support made in accordance with my invention. Fig. 2 is a view partially in rear elevation and partially in vertical section of the parts shown in Fig. 1. Fig. 3 is a side elevation of a lamp or lamp and license sign support. Fig. 4 is a vertical section thereof. Fig. 5 is a detail sectional view on the line 5—5 of Fig. 1. Fig. 6 is a plan view of a modified form of carrier supporting bracket and spring clip. Fig. 7 is a detail showing the manner of attaching a lamp or lamp and license sign bracket on the spring clip and bracket. Fig. 8 is a rear elevation of a modified form of carrier. Figs. 9 and 10 are detail sections on lines 9—9 and 10—10 of Fig. 8. Fig. 11 is a detail, showing one of the stages of manufacture of the tire carrier shown in Fig. 8. Fig. 12 is an interior elevation of the modified carrier shown in Fig. 8.

My improved tire carrier is shown in Figs. 1 and 2 as applied to a motor vehicle having three-quarter rear elliptical springs, the lower members 10 of which are suitably clipped to the rear axle 11 of the vehicle and the upper members 27 of which are attached to the frame bars 12 at the rear end of the body 13 of the vehicle by a clip device hereinafter to be described. The carrier shown in Figs. 1 and 2 is made generally like that shown in my co-depending application for United States Letters Patent, Serial No. 704,630, filed of even date herewith; it comprising a channeled frame member 14, herein shown as comprising slightly more than one-half of a circle, with the flanges directed outwardly and the smooth surface thereof facing inwardly. Associated with said frame member are saddle members 15, 16 arranged crosswise of and attached to the part circular frame member; the former located at the lower central portion of the frame member and the latter near the ends of said frame member; said saddle members being supported and fixed in rigid relation relative to each other by the frame member 14 and constituting a seat to receive a tire or tires that are confined in the carrier by the straps 17, 18, 18, in the general manner indicated in my aforesaid prior application.

The tire carrier shown in my aforesaid prior application is designed more specifically for attachment to the running board of the vehicle. The tire carrier herein shown is designed to be attached to or carried at the rear of the vehicle body. For this purpose it is provided with the fittings 20, 20 attached to and positioned between the flanges of the frame member 14 near the ends of the latter. The said fittings in the construction herein shown, are provided with laterally directed hollow lugs 21 which are interiorly tapered to fit over tapered pins or plugs 22 that are driven into openings in the rear end of brackets 23, 23, suitably supported on the vehicle. The said fittings 21 are confined on said tapered pins or lugs by screw bolts 24, 24 screw-threaded into axial openings in the tapered pins or plugs 22. The said brackets, as herein shown, constitute, in addition to their function as tire carrier supporting brackets, spring clip fittings 26 which are fitted to the upper sides 27 of the three-quarter elliptical springs, herein shown, and are clamped upon the frame member 12 of the car body by the clamping bolts 29 which extend through lateral lugs 28 of said clips and flanged fittings 30 attached to the frame of the car body. As shown in Figs. 1 and 2 the said brackets 23 extend upwardly and rearwardly from the clip portions 26 thereof and terminate in the reduced tapered portions or studs 22 over which the lugs 21 of the fittings 20 of the tire carrier engage. The brackets 23, as shown in Figs. 1 and 2, are adapted to a form of motor vehicle having a short body, and extend sharply upwardly from their clip portions 26 and thence rearwardly. In Fig. 6 is shown a combined clip and carrier supporting bracket comprising the clip portion 33 and the integral rearwardly extending bracket portion 34 which is reduced and tapered at its rear end 35 to engage the tire carrier fittings 20. The form of combined bracket and spring clip shown in Fig. 6 is designed for motor vehicles having long or over hanging tonneau bodies. Either or both of the combined spring clips and tire brackets may be provided with laterally directed lugs 37, shown best in Figs. 2, 6 and 7 adapted to receive the screw-threaded ends of fender irons 38 to support the rear ends of the fenders 40, as shown in Figs. 1 and 2.

The tire carrier shown in Figs. 8 to 12, inclusive, comprises a sheet metal, part-circular, trough-shaped frame 42 which is reinforced at its margins by the wires or rods 43, 43. In the specific form of the carrier shown in Fig. 8 it comprises, in addition to the trough-like seat portion of the carrier, that embraces in its dimensions substantially one-half a circle, a cover portion or member 45, usually made of the same construction as the seat portion and hinged to the fixed seat portion to hold the tire in place therein, and said cover portion is adapted to be swung upwardly away from the seat portion, as indicated in dotted lines in Fig. 8, to permit the tire to be removed upwardly and away from the carrier. Said covered portion 45 is shown as hinged to the fixed portion 42 by means of the hinge fittings 48, 49, one attached to the fixed member and the other to the swinging member, said fittings overlapping each other and being provided with alined openings 50 to receive a hinge pin or pintle which may comprise the tapered plug 22 or 35 of the bracket 23 or 34, when said carrier is supported by said brackets or the like. At the other side of the carrier the fixed member 42 thereof is provided with a fitting 52, and the free end of the swinging portion or cover is provided with a like fitting 53 having a locking lug 54 adapted to fit in overlapping engagement with a like lug 55 on the fitting 52, said lugs being provided with alinement openings to receive a suitable locking device 56. The lock fitting 52 is provided with an opening to fit over the tapered plug of the bracket 23 or 34, when said brackets are employed to support the carriers. The said hinge and locking fittings are preferably provided with rubber or like yielding buffers 57 arranged between lugs 58, 58 of the fittings, as shown in Fig. 8 to prevent rattling of one part on the other.

The trough-shaped seat portion and cover of the carrier shown in Fig. 8 comprises a sheet metal body that is transversely slitted, as shown at 59 in Fig. 11, and having the openings 60 at the ends of said slits. In constructing the sheet metal carrier shown in Figs. 8 to 12, inclusive, a strip of sheet metal is transversely slitted at 59, as indicated in Fig. 11 and formed with the openings 60 at the ends of said slits. Thereafter, the marginal portions of the strip are folded over the rods 43 to produce the construction shown in Fig. 11. Thereafter, the said sheet metal strip, having the margins thereof folded about the rods 43 is formed, by a suitable forming die, into the trough or concave shape shown in Figs. 8, 9, 10 and 12. In so forming the slitted strip, the marginal portions thereof, folded about the rods 43, as aforesaid, are brought toward each other, as indicated by a comparison of Figs. 11 and 12.

By transversely slitting the sheet metal body as shown it may be formed up without swaging or stretching the metal, so that thereby the metal is not weakened, but retains its strength in the finished carrier. This form of carrier has the advantage of being light and continuous, and adapted to be attached to the vehicle at two or more separated points. When employing the swinging cover 45 the tire is held in place by said cover, and the tire is adapted to be removed upwardly from the trough-shaped seat, when the swinging cover is swung backwardly. In the absence of said swinging cover or section, the tire may be fastened into the trough-shaped seat by means of the straps such as are shown in Figs. 1 and 2.

The hinge fittings 48 and 49 and the locking fittings 52, 53 may be conveniently attached to the sheet metal form of carrier by being provided at their margins with flanges 62 to receive the wires 43, as most clearly shown in Figs. 9 and 10. Obviously, however, the said hinge and lock fittings may be otherwise attached to carrier body and frame.

In connection with the tire carrier bracket shown in Figs. 1 and 2, I propose to provide a lamp or combined lamp and license sign bracket, such as shown in Figs. 1, 3 and 4. The said bracket comprises a member 60, having a lug 61 that is adapted to be attached by the stud 24 to the rear end of the bracket 23 or 34, and an outer member 61' having an upstanding portion 62 to which is adapted to be attached a lamp, or a lamp and license sign. The said members 60 and 61 are provided with hub portions 63, 64 arranged horizontally one over the other, and herein shown as fastened together by a stud 65 that is screw-threaded to the hub 64 and extends downwardly through a hollow lug or boss 66 of the lower hub member 63; said stud being screw-threaded to the upper hub member 64 and extending downwardly and beyond said hollow stud or boss and provided with a head 68. Within the hollow lug or boss, and between a shoulder therein and said head 68 of the stud 65, is a spiral expansion spring 70 which tends to hold together the ribbed and grooved faces of the hub members 63, 64.

The lamp and license sign bracket is adapted to support a lamp and license sign with the license sign arranged in a plane in rear of and parallel to the plane of the tire in the carrier; and the construction described permits the member 62 of the lamp and license sign bracket to be turned on the axis of the stud 65 to swing the license sign outwardly away from the tire or tires, so that the latter may be laterally removed from the carrier, when the carrier assumes the form shown in Figs. 1 and 2

I claim as my invention:—

1. A tire carrier comprising a lower trough-shaped or part-circular tire seat, an upper cover portion fitted thereto to hold the tire in place in said seat, a hinge to hinge one end of the cover portion to the seat, to permit the cover to swing upwardly, a lock to lock the other end of the cover to said seat, and means associated with said hinge and lock to fasten the carrier to a support.

2. A tire carrier comprising lugged supporting members adapted to be attached to a vehicle, a lower tire seat, an upper cover member, a hinge to hinge the cover member at one end thereof to said tire seat to permit the same to swing upwardly, a lock at the other end of the cover member to lock it to said seat, said hinge and lock comprising overlapping lugs having registering openings to receive the lugs of the said supporting members.

3. A tire carrier comprising a part-circular frame composed of a transversely slitted sheet-metal body of concave cross section.

4. A tire carrier comprising a part-circular frame composed of a transversely slitted sheet-metal body of concave cross section, and rods at the sides of the carrier about which the sheet-metal body is wrapped at its margins.

5. A tire carrier comprising a part-circular frame composed of a transversely slitted sheet-metal body of concave cross section, rods at the sides of the carrier about which the sheet-metal body is wrapped, and a cover member hinged at one end to said frame, with means at the other end thereof for locking the same to said frame.

6. A tire carrier comprising a part-circular frame composed of a transversely slitted sheet metal body of concave cross section, rods at the sides of the carrier about which the sheet-metal body is wrapped, and fittings having openings through which said rods extend and having means whereby they may be attached to the vehicle.

In testimony, that I claim the foregoing as my invention I affix my signature in the presence of two witnesses, this 14th day of June, A. D. 1912.

THOMAS I. DUFFY.

Witnesses:
G. E. Dowle,
W. L. Hall.